Patented Sept. 14, 1943

2,329,307

UNITED STATES PATENT OFFICE 2,329,307

MANUFACTURE OF CATALYSTS

Charles L. Thomas and Jacob Elston Ahlberg, Chicago, Ill., assignors to Universal Oil Products Company, Chicago, Ill., a corporation of Delaware No Drawing. Application August 5, 1939, Serial No. 288,576

8 Claims. (Cl. 252—254)

This is a continuation-in-part of our pending application 236,548 filed October 22, 1938, which is a continuation-in-part of our application 171,986 filed October 30, 1937.

This invention relates more particularly to the manufacture of catalysts suitable for accelerating reactions among hydrocarbons.

More specifically it has reference to a method for manufacturing refractory catalytic materials which are particularly effective in selectively promoting the formation of gasoline boiling range liquids from relatively heavy petroleum fractions.

The art of pyrolytically cracking relatively heavy hydrocarbons to produce primarily gasoline or gas is very extensive and it is recognized that most of the basic principles of hydrocarbon decomposition are known and that particular commercial processes have been developed which embody these principles. The application of catalysts, however, in cracking reactions is practically upon the same basis as it is in other fields, that is, it is largely empirical. A considerable number of the catalysts tried out in cracking have a tendency to accelerate reactions leading to the formation of gas rather than of gasoline, this being particularly evidenced by reduced metal catalysts, such as nickel or iron, and many of such catalysts are sensitive to sulfur poisoning and are quickly coated with carbonaceous materials which render them practically inert. This deposition of carbonaceous materials is frequently related to the type of decomposition reactions selectively fostered by the catalyst.

The present invention is concerned with the manufacture of catalytic materials which are specially adapted to accelerate the cracking of heavy fractions of petroleum and other hydrocarbonaceous materials to increase the rate of production of high antiknock gasoline boiling range fractions and gaseous by-products which contain unusually high percentages of readily polymerizable olefins which are a potential source of further gasoline yields. The preferred catalysts are characterized by selectivity in accelerating gasoline-forming reactions rather than light gas-forming reactions, by their selectivity in producing high antiknock gasoline, by their refractory character which enables them to retain their catalytic properties under severe conditions of temperature and pressure, by their ease and simplicity of manufacture and their exact reproducibility.

In one specific embodiment the present invention comprises the manufacture of catalysts suitable for use in hydrocarbon conversion reactions, more particularly the conversion of hydrocarbon fractions containing substantially no gasoline into substantial yields of gasoline of high antiknock value and gases containing relatively high percentages of readily polymerizable olefins by preparing in the primary step a mixture of hydrated alumina and hydrated silica to form hydrated alumina-silica masses of varying aluminasilica ratios, and subsequently treating and washing the composite masses to effect substantially complete removal of alkali metal ions therefrom, then drying to remove a major portion of the water content, forming into particles of definite sizes and calcining the purified catalytic material.

We have found that silica-alumina catalysts are rendered much more stable over long periods of use and also more active and selective in accelerating gasoline-forming reactions in cracking when the originally precipitated hydrated alumina and hydrated silica which go to form the primary composites in various proportions are substantially freed from alkali metal ions which in the more general methods of preparation will be sodium ions inasmuch as the various sodium silicates comprise one of the more readily available raw materials for the manufacture of this type of catalyst. In the primary step hydrated silica and hydrated alumina may be separately precipitated and the precipitates mixed in the wet condition. In the case of silica, a convenient method is to acidify a solution of an alkali metal silicate to precipitate a silica gel. In the case of alumina, the desired hydroxide may be precipitated by the addition of alkaline materials generally, or volatile basic precipitants generally may be employed. As a variation of this method a separately precipitated hydrated silica may be added to an aqueous solution of an aluminum salt and the hydrated alumina precipitated in the presence of the suspended silica by the addition of alkaline materials generally or volatile basic precipitants. Alternatively, a separately precipitated hydrated alumina may be suspended in a solution of an alkali metal silicate and the silica precipitated in the presence of the suspended alumina by the addition of just the required amount of acid which is insufficient to redissolve the alumina.

Obviously the character and efficiency of the ultimately prepared alumina-silica catalysts will vary more or less with the exact conditions of precipitation and/or mixing, purification treatment, and the ratio of alumina to silica. For example, one preparation may furnish catalysts best suited for use in the cracking of heavy hydrocarbon fractions, another may be better adapted for use in reforming hydrocarbons substantially within the gasoline boiling point range, while still another preparation may be better adapted for still other hydrocarbon reactions.

In the catalysts thus prepared the ratio of silica to alumina by weight may range from 1 to 1 to 10 to 1 or greater ratios may be used, active catalysts having been prepared in which the ratio is as high as 50 to 1 so that in effect the alumina may be considered to act as a promoter of the catalytic activity of the silica. It is to be recognized that very little is known positively concerning the mechanism of promoter action in catalysts and no attempt will be made herein to offer any definite reason for the observed effect of the addition of varying amounts of alumina to silica. There may be a joint promoter effect or it may be that the alumina is the more active catalyst and is extensively dispersed in and on the silica in order to present a large surface.

An important feature of the present invention resides in the fact that catalysts of greatly increased stability and efficiency in cracking reactions are produced when there is substantially complete exclusion of alkali metal ions from the hydrated alumina-silica masses prior to their drying and calcining to prepare them for service. It is not positively known whether the alkali metal compounds, such as those of sodium, are present in the primary hydrated composites in chemical combination or in an adsorbed state, but it has been definitely determined that their exclusion or removal is necessary if catalysts of superior activity and stability are to be obtained. It may be considered that the presence of these alkali metal ions may cause a sintering or fusion of the surfaces of the primary composites of the catalytic material at elevated temperatures so that the porosity of the catalyst particles is reduced or altered with a corresponding reduction in effective surface, considering the catalytic effects to be due at least in part to surface action. However, such concepts are principally speculative in view of the difficulty of obtaining direct confirmatory evidence.

Several alternative methods are applicable to different primary hydrated silica-hydrated alumina composites to insure the substantially complete absence of sodium or other alkali metal ions. One method consists in treating and washing the primary hydrated silica-hydrated alumina precipitates or composites with regulated quantities of acidic solutions to extract alkali metal compounds incorporated into the composite catalytic materials during preparation by the formation of corresponding alkali metal salts and possibly introducing hydrogen into the catalyst composites. Thus a precipitated hydrated silica-hydrated alumina mass may be first washed with water to remove the major portion of the soluble impurities and subsequently treated with relatively dilute hydrochloric acid, for example, and water to remove the alkali metal ions. As an alternative purification method, the primary composites may be treated with ammonium compounds or salts, such as ammonium chloride in solution or other halides, the sulfate, the nitrate, the phosphates or the acetate so that alkali metal ions will not be substantially present in the composite when the composite preparation has been suitably washed. Whether the alkali metal ions are present in the hydrated alumina-hydrated silica mixture in a chemically combined or adsorbed condition, the alkali metal ions may be replaced by the ammonium ions which will be later expelled from combination or adsorption in subsequent treatment at elevated temperatures. As a variation of this method the co-precipitation of the primary hydrated silica and hydrated alumina may be brought about in the presence of ammonium hydroxide, or any of the other salts of ammonium already mentioned, in sufficient excess to insure an adequate removal of the alkali metal ions. In the case of co-precipitation, when using alkali metal silicates it has been found when admixing larger amounts of alumina that the necessary excess of ammonia is present at the point corresponding to the presence of a gel structure of the primary precipitate which permits ready filtering and washing. In other words, if sufficient ammonia has been used to insure easy washing and filtering, the alkali metal ions have been generally removed to a degree at which they no longer have any appreciable adverse influence on the catalyst properties. In these methods of preparing the primary composite and in subsequent methods given below, it will be apparent that the purifying treatment may be introduced in the presence of the original reacting materials, or subsequent to the removal of soluble salts by preliminary treatment as, for example, by filtering and water washing.

The weight of evidence at hand on the mechanism leading to the replacement of alkali metals in the primary hydrated silica-hydrated alumina masses indicates that the alkali metals are held by adsorption rather than by chemical bonds. This is indicated by the fact that the alkali metal ions are replaceable by ammonium or multivalent positive ions which are known in general to be more strongly adsorbed than alkali metal ions. This differentiates this replacement from the base exchange that occurs in the case of zeolites.

Another alternative method of removing alkali metal ions from precipitated hydrated silica-hydrated alumina composites consists in treating such composites with salts of metals which may replace the sodium or other alkali metals in the manner similar to that described in the case of ammonium compounds. For example, a primary composite having large amounts of alkali metal compounds present, also a primary composite containing undesirably large amounts of adsorbed alkali metal ions even after thorough water washing may be treated with a solution of salts of multivalent metals, more particularly aluminum, in which the metal forms the positive ion of the salt being used. In this mode of operation the multivalent metal used to replace the adsorbed alkali metal ions is introduced into the catalytic material and is not removed at elevated temperatures as is the ammonium above described. Whatsoever the purification method used, catalysts suitable for hydrocarbon cracking reactions have been obtained by the use of all the methods above described.

After the final washing of a hydrated alumina-hydrated silica mixture, it may be recovered as a filter cake and dried at a temperature of the order of 240–300° F., more or less, after which it may be pressed and sized to recover particles of a convenient average size or formed into desired shapes by compression methods. It has been found that after the usual drying treatment the material usually has a total water content of approximately 15 percent which appears to correspond to the best workability of the material. By calcining the particles at temperatures of the order of 850–1000° F., or higher, maximum activity of the catalyst is obtained and a further dehydration occurs so that, for example, after a period of heating at 900° F. the water content as determined by analysis is of the order of 2 to 3 percent which does not vary appreciably either as the result of long service or a large number of reactivations at considerably higher temperatures.

Catalysts prepared by the above general procedure evidently possess a large total contact surface corresponding to a high porosity, the pores being of such size that hydrocarbon oil vapors are able to penetrate to a considerable distance and yet not so small that when the pores become clogged with carbonaceous deposits after a long period of service, they are difficult to reactivate by oxidation. This structure is also retained after many alternate periods of use and reactivation as evidenced by the fact that the catalyst may be repeatedly reactivated by passing air or other oxidizing gas over the spent particles to burn off deposits of carbonaceous material at temperatures as high as 1400 to 1600° F. without material loss of catalytic activity.

According to the present process catalysts prepared by the general procedure described in the preceding paragraphs are utilized to advantage in cracking reactions when employed as filling material in tubes or chambers in the form of pellets or granules. In the examples given below, wherein hydrocarbon fractions readily vaporizable at moderate temperatures without extensive decomposition are employed, the average particle size is within the range of 1 to 10 mesh, which may apply either to pellets of uniform size and short cylindrical shape or to particles of irregular size and shape produced by the grinding and sizing of the partially dehydrated materials.

The general procedure in cracking involves contacting the hot hydrocarbonaceous material with the catalyst, and the subsequent fractionation steps involving separation of residuum and the further splitting up of the products into fixed gases, fractions of gasoline boiling range and heavier recycle stocks, may obviously be followed in the case of the catalysts comprised within the scope of the invention. In using these catalysts moderate temperatures, relatively low pressures and high throughputs are to be expected in comparison with the strictly thermal cracking processes in use at the present time.

The following example of the preparation of catalysts peculiar to the present invention is given to indicate its novelty and utility although not for the purpose of limiting the invention in exact agreement with the data introduced.

390 cc. of concentrated hydrochloric acid in 1815 cc. of water were added to 568.4 grams of sodium silicate ($Na_2SiO_3.9H_2O$) in 3 liters of water. The precipitate which formed was then separated by filtration. Filter cake was slurried in 2½ liters of water and again filtered, being only washed once to remove a major portion of the soluble salts. The precipitated silica was then slurried in 3 liters of water to which was added a suspension of alumina precipitated by the addition of .50 equivalents of ammonia in 500 cc. of water to 40.24 grams of aluminum chloride hexahydrate dissolved in 500 cc. of water. The mixture of alumina and silica was filtered and the filter cake slurried in 2½ liters of water and filtered. The filter cake was then slurried in 2½ liters of water containing 5 grams of aluminum chloride hexa-hydrate per liter and again filtered, this treatment being repeated several times. The composite precipitate was then water washed once and dried at approximately 300° F., the dried material pressed and sized into 6–10 mesh granules. The granules were calcined at approximately 932° F.

Using granules of this catalyst in a catalyst chamber a Pennsylvania gas oil was vaporized and preheated to a temperature of 932° F. and passed through the granular catalyst bed at a liquid space velocity per hour of approximately 4. In a single pass there was produced 25.2% of 400° F. end point gasoline having an octane number of 80.2. There was also produced 4.5% by volume of the original charge of readily polymerizable 3 and 4 carbon atom olefins.

We claim as our invention:

1. A process for producing catalysts which comprises acidifying an alkali metal silicate solution to precipitate silica hydrogel, separating the silica hydrogel and suspending the same in an aqueous solution of an aluminum salt, adding an ammonium compound to the suspension to precipitate hydrated alumina in the presence of the suspended silica, washing the resultant silica-alumina mixture with an aqueous solution of a compound having a cation capable of replacing alkali metal ions present in the mixture, and subsequently calcining the mixture.

2. The process as defined in claim 1 further characterized in that the second-mentioned compound is a salt of a multivalent metal.

3. The process as defined in claim 1 further characterized in that the second-mentioned compound is an aluminum salt.

4. The process as defined in claim 1 further characterized in that the second-mentioned compound is a mineral acid.

5. The process as defined in claim 1 further characterized in that the second-mentioned compound is hydrochloric acid.

6. The process as defined in claim 1 further characterized in that the second-mentioned compound is an ammonium compound.

7. A process for producing catalysts which comprises acidifying an alkali metal silicate solution to precipitate silica hydrogel, combining said hydrogel with an aqueous solution of an aluminum salt, adding an ammonium compound to precipitate hydrated alumina in the presence of the silica, washing the resultant silica-alumina composite with an aqueous solution of a compound having a cation capable of replacing alkali metal ions present in the composite, and subsequently drying said composite.

8. A process for producing catalysts which comprises acidifying an alkali metal silicate solution to precipitate silica hydrogel, combining said hydrogel with an aqueous solution of an aluminum salt, adding an ammonium compound to precipitate hydrated alumina in the presence of the silica, washing the resultant silica-alumina composite with an acidic solution to substantially completely remove alkali metal ions from the composite, and subsequently drying the mixture.

CHARLES L. THOMAS.
JACOB ELSTON AHLBERG.